United States Patent [19]

McMurtry

[11] 4,084,323

[45] Apr. 18, 1978

[54] MEASURING APPARATUS

[75] Inventor: David Roberts McMurtry, Wooton-under-Edge, England

[73] Assignees: Rolls-Royce Limited; Renishaw Electrical Limited, Great Britain

[21] Appl. No.: 685,072

[22] Filed: May 10, 1976

[30] Foreign Application Priority Data

May 13, 1975 United Kingdom ............... 20019/75

[51] Int. Cl.² .......................... G01B 5/00; G01B 7/00
[52] U.S. Cl. ................................ 33/174 L; 33/1 M
[58] Field of Search ............... 33/1 M, 169 R, 172 R, 33/172 E, 174 R, 174 L, 174 P, 174 PC

[56] References Cited

U.S. PATENT DOCUMENTS

| 3,869,799 | 3/1975 | Neuer et al. | 33/174 L |
| 3,888,012 | 6/1975 | Droz | 33/174 L |
| 3,945,124 | 3/1976 | Jacoby et al. | 33/169 R |
| 3,990,153 | 11/1976 | Calame | 33/174 L |

Primary Examiner—Richard E. Aegerter
Assistant Examiner—Richard R. Stearne
Attorney, Agent, or Firm—Stevens, Davis, Miller & Mosher

[57] ABSTRACT

The stylus of a work piece measuring probe is supported for movement in three dimensions by three pairs of leaf springs connected in series and arranged as if lying at the six sides of a rectangular box.

4 Claims, 7 Drawing Figures

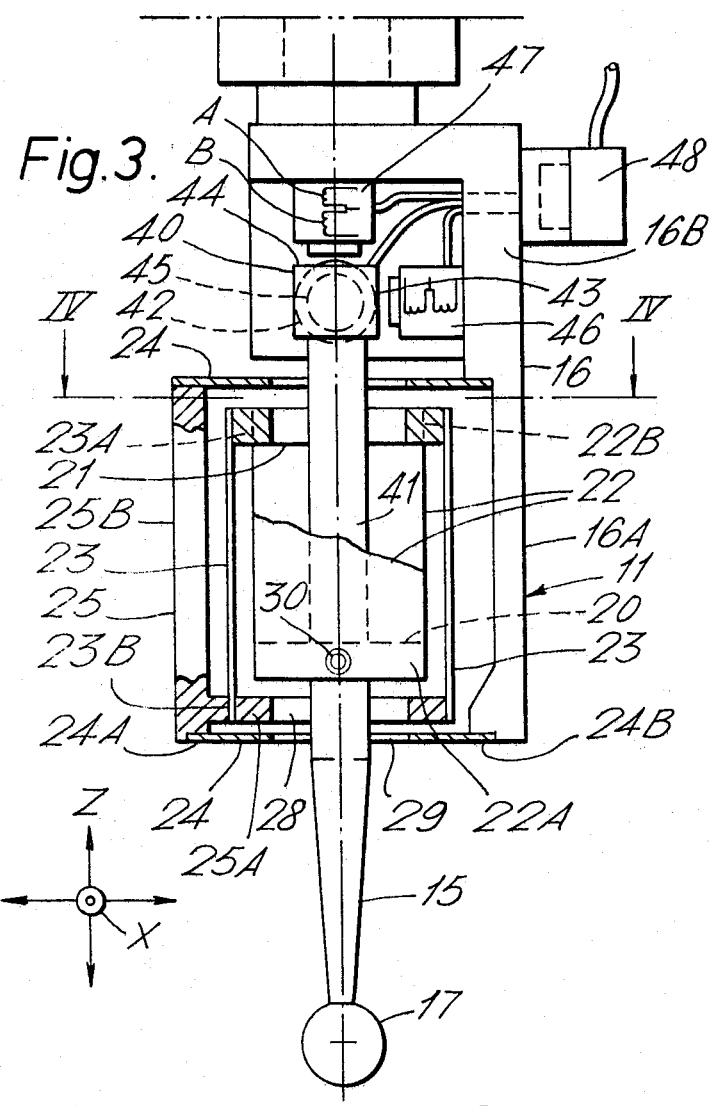
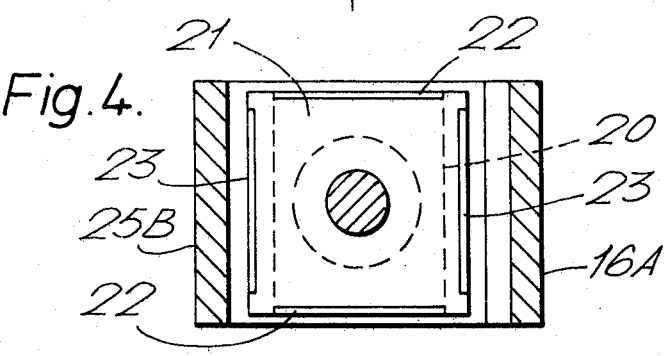

MEASURING APPARATUS

This invention relates to measuring apparatus.

It is an object of this invention to provide measuring apparatus in which a stylus is supported on a support for movement relative thereto and wherein leaf springs are used for the support of the stylus for movement in at least two dimensions of a rectangular co-ordinate system. It is a further object of this invention to provide for a space-saving arrangement of the springs both in a two dimensional and in a three dimensional arrangement of the springs.

According to this invention there is provided measuring apparatus having a stylus and a support to which the stylus is connected for movement relative thereto, characterized by a first pair of parallel leaf springs having relatively fixed and free ends, a second pair of parallel leaf springs having relatively fixed and free ends and extending in planes perpendicular to the extent of the springs of the first pair between the fixed and free ends thereof, a rigid intermediate member secured to the fixed ends of the first and the free ends of the second pair, and two end members secured respectively to the free ends of the first and the fixed ends of the second pair and connected respectively to the stylus and the support.

Figure 1:
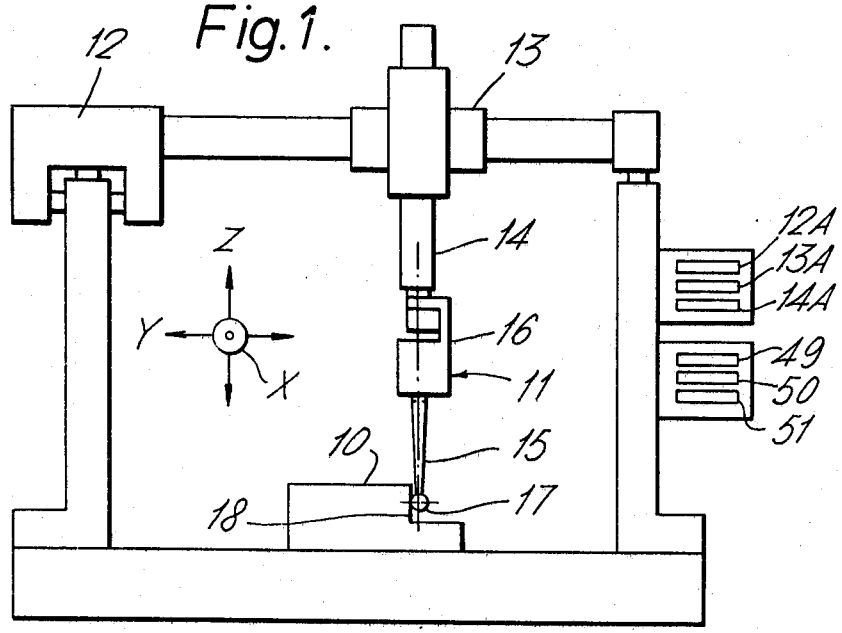
Figure 2:
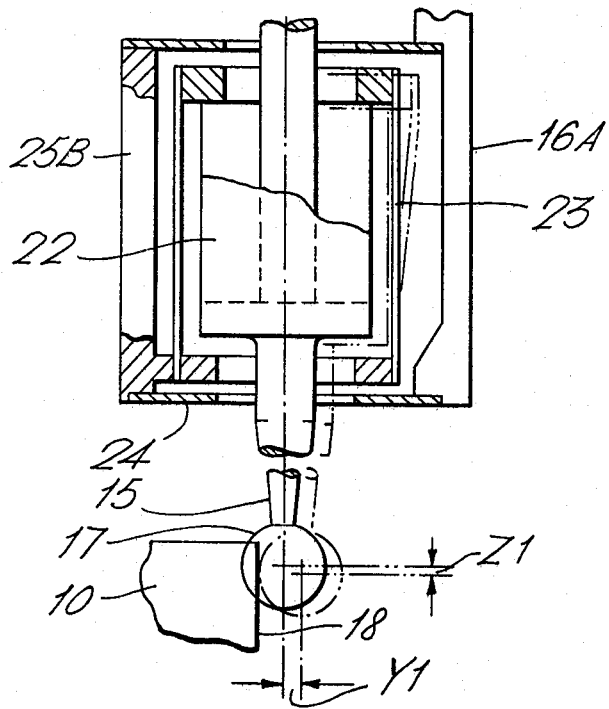
Figure 5:
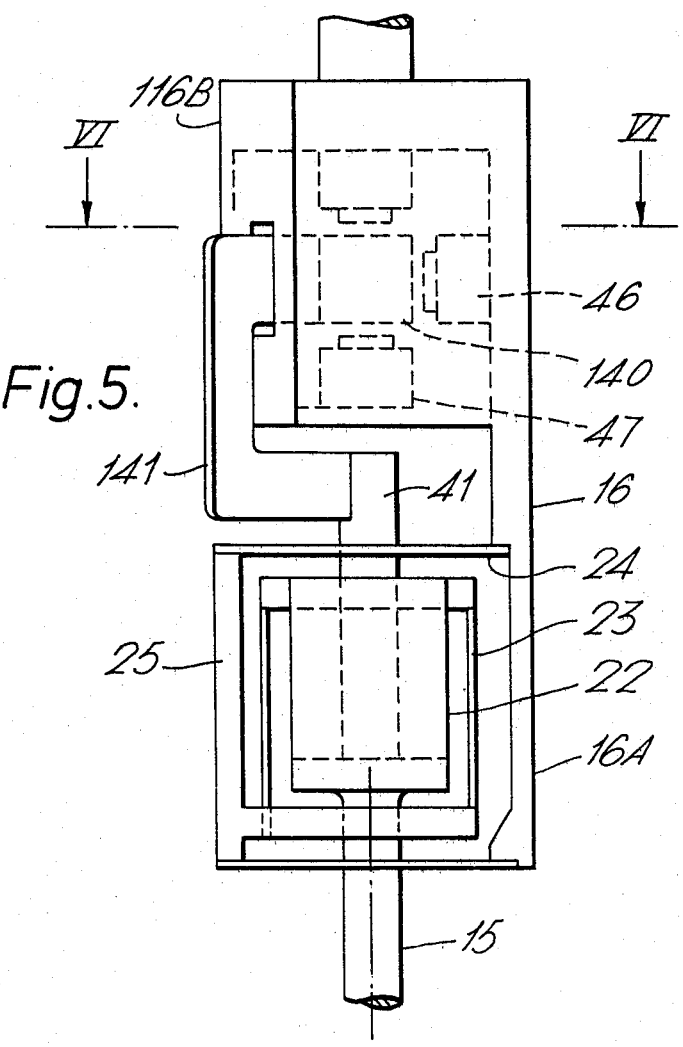
Figure 6:
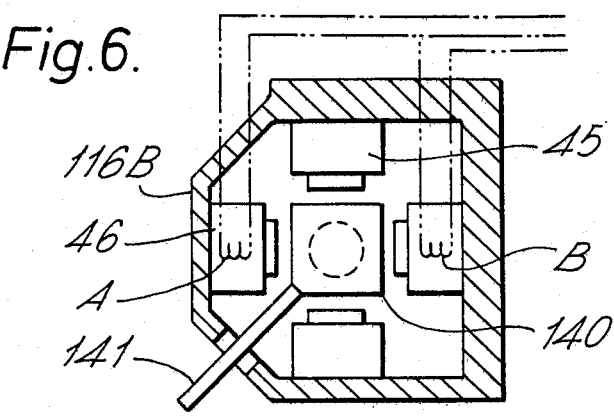
Figure 7:
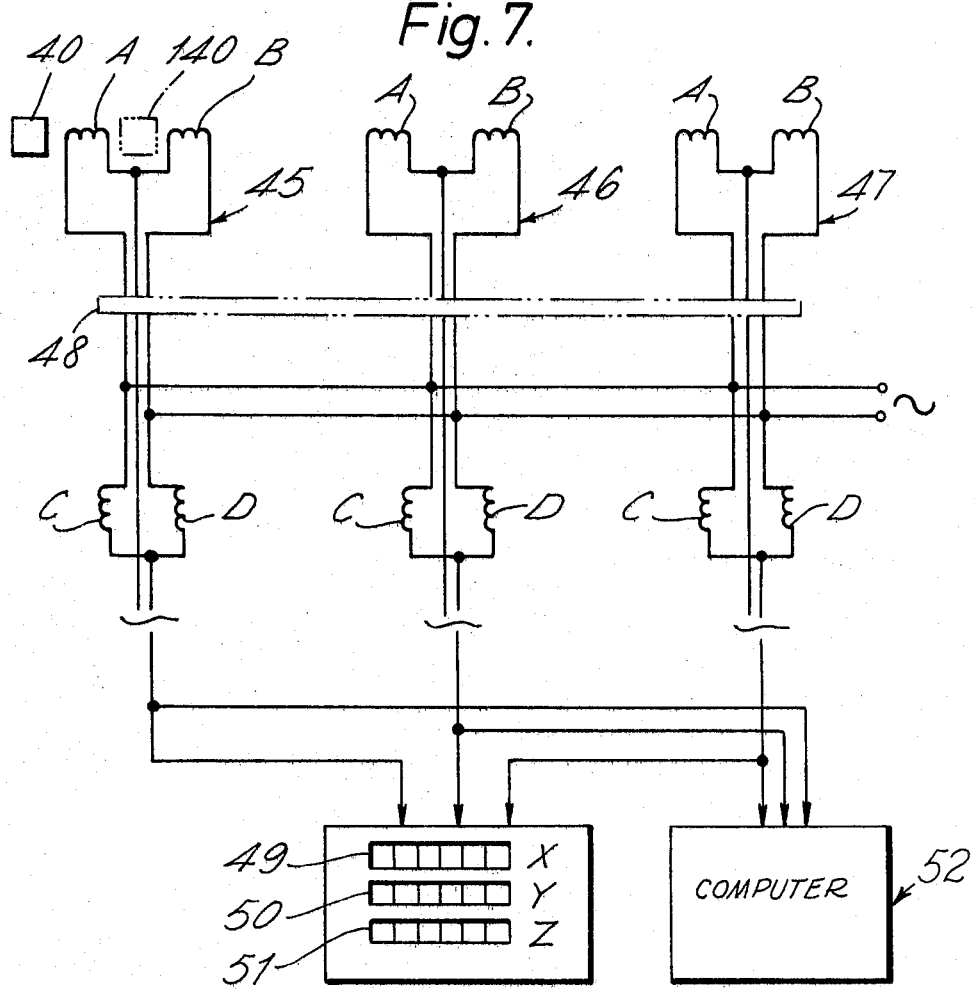

Examples of apparatus according to this invention, being in the form of probes for use with an inspection machine, will now be described with reference to the accompanying drawings wherein:

FIG. 1 is an elevation of an inspection machine including said probe.
FIG. 2 is a detail of the probe.
FIG. 3 is a sectional elevation of the probe.
FIG. 4 is a section on the line IV — IV in FIG. 3.
FIG. 5 is an elevation of a modified form of the probe.
FIG. 6 is a section on the line VI — VI in FIG. 5.
FIG. 7 is a circuit diagram.

An example of the use of the probe will at first be described with reference to FIG. 1. The probe, denoted 11, is supported by carriages 12, 13, 14 movable in the X, Y and Z directions of a right angle co-ordinate system. The movement of the carriages is indicated by respective digital displays 12A, 13A, 14A. The probe has a stylus 15 supported relative to a support or housing 16 for movement in the X, Y and Z directions and is biased by a spring system (to be described) into a zero position relative to the housing. To measure a work piece 10 the appropriate carriage, say the carriage 13, is moved until a ball end 17 of the stylus touches a relevant surfce 18 of the work piece. This disturbs the zero position of the probe and results in a signal which is used to stop the display 13A of the carriage movement, the display then showing the position of said surface relative to a pre-selected datum. The carriage is of course stopped, either automatically or by the operator, as soon as possible after contact between probe and work piece but a certain overrun of the carriage (FIG. 2) is of course unavoidable. In some applications the workpiece is measured by measuring the overrun of the probe and deducting this from the measurement of the position which the carriage has when stopped at the end of the overrun. However, the housing 16 may be fixed and the probe maybe used as a measuring device independently of the carriages 12, 13, 14.

STYLUS SUPPORT SYSTEM

Referring to FIGS. 3 and 4, the stylus is generally rod-shaped and extends between the ball 17 and a member 20 connected to the housing 16 by three pairs of leaf springs 22, 23, 24 inter-connected in series and arranged to flex in the X, Y and Z dimensions respectively. To this end the springs 22 lie in planes including the Y and Z dimensions, the springs 23 lie in planes including the X and Z dimensions, and the springs 24 lie in planes including the X and Y dimensions. The member 20 and a part 16A of the housing constitute end members of the in-series connection of the spring pairs.

In order to explain the spring arrangement each spring may be regarded as having a free and a fixed end, the fixed end being the end which, in the in-series connection, is nearest the housing 16. The connections between the springs may then be defined by saying that the springs 22 have free and fixed ends 22A, 22B secured respectively to the member 20 and an intermediate member 21, the springs 23 have free and fixed ends 23A, 23B secured respectively to the member 21 and a second intermediate member 25, and the springs 24 have free and fixed ends 24A, 24B secured respectively to the member 25 and a part 16A of the housing 16.

It may therefore be said that the springs 24 lie in planes perpendicular to the extent of the springs 23 between their fixed and free ends 23A, 23B, i.e. perpendicular to the extent of the springs 23 in the Z dimension, and the springs 22 lie in planes parallel to the extent of the springs 23 between their fixed and free ends 23A, 23B.

To make possible the connection between the springs 23, 24 to the second intermediate member 25, the latter has a part 25A connecting the fixed ends of the springs 23 and a perpendicular part 25B connecting the free ends of the springs 24, the fixed ends of the latter spring being connected by the part 16A.

In order to bring about a compact space-saving arrangement of the springs 22, 23, 24, these springs are grouped so that the space between any two springs of a pair is shared with the space between at least one other pair. This is achieved in the present example by arranging the springs 24 in X, Y planes respectively nearer the fixed and free ends 23A, 23B of the springs 23. Similarly, the springs 24 lie in planes respectively nearer the fixed and free ends 22A, 22B of the springs 22. However, it is possible for the springs 24 to be situated so that the space between them lies above the upper ends of the springs 23 at some sacrifice in the height of the spring arrangement.

The end members 20, 16A and the intermediate members 21, 25 are each rigid members, that is they are of sufficient thickness not to undergo any significant deflection when the springs 22, 23 or 24 are flexed in operation. This of particular importance in the part 25B which has to be rigid to avoid torsional deflection of the springs 24 under a force in the X or Y direction on the stylus.

As shown, the member 20 to which the stylus is secured is innermost to the box shape formed by the springs 22, 23, 24. Hence the member 25A and the adjacent spring 24 have holes 28, 29 for the stylus to extend to the exterior of the said box. But such holes would not be necessary if the stylus is connected to an edge of the member 20, as by being screwed into a hole 30, to extend in the plane of the dimensions X, Z.

The springs 22, 23, 24 may be secured to the members 20, 21, 16 by brazing.

The springs 24 may, as shown, lie fully outside the extent of the springs 23 in the Z dimension but adjacent the respective ends 23A, 23B of the springs 23.

The springs may each be made of a single piece of sheet material which is continuous, i.e. is free from cut-outs, thereby to assist in avoiding said torsional deflection.

MEASURING SYSTEM

As mentioned, the springs 22, 23, 24 bias the stylus into a zero position. This position is defined by the position adopted by the centre of the ball 17 solely under the action of the springs and gravity, i.e. when there is no external force on the ball. FIG. 2 shows this zero position in full lines. Engagement with the face 18 of the work piece is shown as having resulted in a displacement Y1 in the Y dimension as shown in dotted lines. Due to the way in which the shape of the springs, in this case the springs 23, changes during the displacement Y1 there inevitably occurs also a secondary displacement Z1 in the Z dimension. Generally, a displacement in any one dimension results in a secondary displacement in at least one of the other dimensions, and a true reading of the co-ordinate position of the ball 17 requires that all three dimensions, or two dimensions if only two dimensions are required, are sensed at the same time.

The measuring system comprises (FIGS. 3, 4) an iron mass 40 secured to the member 20 by an extension 41 so as to accompany any movement of the stylus 15. The mass 40 has surfaces 42, 43, 44 respectively facing in the X, Y and Z dimensions and respectively confronting three sensors or transducers 45, 46, 47 mounted on a part 16B of the housing 16. Each transducer comprises an induction bridge (FIG. 7) whereby to sense a displacement of the mass in the respective dimension X, Y or Z.

Each bridge comprises coils A, B, C, D, of which the coils A, B are located on the housing member 16B in proximity with the respective surface 42, 43 or 44, and the coils A, B are connected through a plug 48 to a convenient stationary location where the remainder of the bridge is situated. The sensing of, for example, displacement in the Y dimension occurs because the movement of the ball 17 changes the distance between the surface 43 and the coils A, B of the transducer 46 and thereby changes the balance of the relevant bridge A, B, C, D. Only movement of the surface 43 in the Y dimension is sensed. Movement in the X or Z dimensions does not affect the transducer 46 because such movements do not affect the distance between surface 43 and the adjacent coils A, B. To ensure this condition the surfaces 42, 43, 44 should be reasonably flat and they must of course be perpendicular to the respective X, Y and Z dimensions. The bridges are in turn connected to respective display units 49, 50, 51 or to a computer 52 for relating the transducer outputs to the position of the carriages 12, 13, 14. In the present example the coils A, B of the respective bridges are situated both at one side of the mass 40.

In modification (FIGS. 5, 6) the coils A, B are situated at opposite sides of the mass. As shown, the mass is in the form of a cube 140 surrounded by a chamber 116B having walls supporting the coils A, B of the respective transducers 45, 46, 47 at opposite sides of the cube 140. The cube is connected to the stylus 15 by a U-shaped blade 141 secured between the support 41 and an edge of the cube so as lie clear of the three pairs of oppositely facing surfaces of the cube. This arrangement of the coils improves linearity of read-out.

I claim:

1. A probe for use in measuring apparatus having stylus support structure comprising:

a first and a second rigid member arranged in spaced relationship;

a first pair of generally flat resilient members arranged in spaced parallelism and secured to the first and second rigid members in position therebetween;

a third rigid member having a first part situated adjacent the first rigid member;

a second pair of generally flat resilient members arranged in spaced parallelism and in positions forming with the first resilient members four sides of a notational six-sided rectangular block, the second pair of resilient members being secured to the second rigid member and to said first part of the third rigid member in position therebetween, the third rigid member having a second part extending from said first part towards the second rigid member;

a fourth rigid member, the fourth rigid member and said second part of the third rigid member being situated at opposite sides of the assembly comprising the first and second pairs of resilient members;

a third pair of spaced apart generally flat resilient members arranged in parallel planes perpendicular to the planes of the first and second resilient members and in positions to form the fifth and sixth sides of said notional block, the third pair of resilient members being secured to the fourth rigid member and said second part of the third rigid member in positions therebetween, wherein said resilient and rigid members are positioned and dimensioned such that the first and fourth rigid members are movable relative to one another in three orthogonal dimensions, and wherein one of the first and fourth rigid members constitutes a support for said stylus support structure and the other one of the first and fourth rigid members constitutes a support for a stylus.

2. Probe according to claim 1, wherein the assembly comprising the first and second resilient members and the first, second and third rigid members lie bewteen the third resilient members.

3. Probe according to claim 1, wherein the assembly comprising the first and second resilient members, the first and second rigid members, and the first part of the third rigid member lies between the second part of the third rigid member and the fourth rigid member.

4. Probe according to claim 1 wherein the first part of the third rigid member lies between the first rigid member and one of the third resilient members.

* * * * *